United States Patent [19]
Rueter et al.

[11] Patent Number: 5,286,271
[45] Date of Patent: Feb. 15, 1994

[54] METHOD AND APPARATUS FOR BENDING GLASS SHEETS

[75] Inventors: Richard E. Rueter, Gibsonia; Robert G. Frank, Sarver; Michael T. Fecik, Pittsburgh, all of Pa.

[73] Assignee: PPG Industries, Inc., Pittsburgh, Pa.

[21] Appl. No.: 908,150

[22] Filed: Jul. 2, 1992

[51] Int. Cl.5 .......................................... C03B 23/023
[52] U.S. Cl. ........................................ 65/106; 65/104; 65/268; 65/273; 65/289
[58] Field of Search ............... 65/106, 104, 273, 268, 65/287, 289

[56] References Cited

U.S. PATENT DOCUMENTS

| | | | |
|---|---|---|---|
| 3,527,589 | 9/1970 | Ritter | 65/289 |
| 4,123,246 | 10/1978 | Johnson | 65/104 |
| 4,204,854 | 5/1980 | McMaster et al. | 65/106 |
| 4,272,274 | 6/1981 | Frank et al. | 65/273 |
| 4,305,746 | 12/1981 | Hagedorn et al. | 65/106 |
| 4,311,509 | 1/1982 | Reader et al. | 65/351 |
| 4,381,933 | 5/1983 | Schultz et al. | 65/106 |
| 4,433,993 | 2/1984 | Frank | 65/104 |
| 4,437,871 | 3/1984 | McMaster et al. | 65/104 |
| 4,496,386 | 1/1985 | Hymore et al. | 65/106 |
| 4,575,390 | 3/1986 | McMaster | 65/273 |
| 4,578,103 | 3/1986 | Fackelman | 65/182.2 |
| 4,579,573 | 4/1986 | Fecik et al. | 65/106 |
| 4,662,925 | 5/1987 | Thimons et al. | 65/104 |
| 4,746,348 | 5/1988 | Frank | 65/104 |
| 4,767,434 | 8/1988 | Schwartz et al. | 65/29 |
| 4,830,650 | 5/1989 | Kelly | 65/106 |
| 4,956,001 | 9/1990 | Kitagawa et al. | 65/107 |
| 4,990,170 | 2/1991 | Vanaschen et al. | 65/104 |
| 5,004,491 | 4/1991 | McMaster et al. | 65/106 |
| 5,006,146 | 4/1991 | Mathivat et al. | 65/273 |

*Primary Examiner*—Joye L. Woodard
*Attorney, Agent, or Firm*—Andrew C. Siminerio

[57] ABSTRACT

Glass sheets are heated to their heat softening temperature and transferred to a shaping station having an upper vacuum mold with a downwardly facing shaping surface corresponding to the desired shape of the glass sheet. The glass sheet is lifted into engagement with the shaping surface and held thereagainst by vacuum. The mold and the glass sheet are then moved to a transfer station and the vacuum is released to deposit the shaped glass sheet onto a contoured conveying surface which generally conforms to the shaped glass sheet. The glass sheet is deposited onto the contoured conveying surface as it is moving from the shaping station to the transfer station to impart movement in the glass sheet along the contoured conveying surface and minimize marring of the glass sheet as it contacts the contoured conveying surface.

20 Claims, 4 Drawing Sheets

METHOD AND APPARATUS FOR BENDING GLASS SHEETS

BACKGROUND OF THE INVENTION

This invention relates to bending heat softenable sheets of material and, in particular, to bending glass sheets using a combination of shaped conveyor rolls, a lifting mold and a vacuum mold.

Shaped and tempered glass sheets are widely used as side windows or rear windows in vehicles such as automobiles or the like. To be suitable for such applications, flat glass sheets must be shaped to precisely defined curvatures dictated by the shape and outline of the frames defining the window openings into which the glass side or rear windows are installed. It is also important that the side or rear windows meet stringent optical requirements and that the windows be free of optical defects and reflective distortion that would tend to interfere with the clear viewing therethrough in their viewing area.

During fabrication, glass sheets intended for use as shaped windows in vehicles are subjected to thermal treatment to temper the glass for strengthening the same and increase the resistance of the shaped window to damage resulting from impact. In addition to increasing the resistance of the glass sheet to breakage, tempering also causes the glass sheet to fracture into relatively small, smooth surfaced fragments that are less injurious than the relative large, jagged fragments that result from the breakage of untempered glass.

The commercial production of shaped glass sheets for such purposes commonly includes heating flat sheets to the softening point of the glass, shaping the heated glass to a desired curvature and cooling the bent sheets in a controlled manner to a temperature below the annealing range of the glass. During such processing, a glass sheet is generally conveyed along a substantially horizontal path through a tunnel-type furnace, heated to its heat softening temperature and transferred into a shaping station adjacent the furnace, where the glass sheet is shaped. After shaping, the glass sheet is transferred to a cooling station where it is controllably cooled. The heat softened glass sheet may be shaped, for example by conveying the sheet over a series of transversely curved conveyor rolls as disclosed in U.S. Pat. No. 4,381,933 or by pressing the sheet between a pair of upper and lower shaping surfaces. In this later process, the upper surface is typically a full surface vacuum mold and the lower surface may be a full surface press as disclosed in U.S. Pat. No. 4,662,925, a segmented mold as disclosed in U.S. Pat. No. 4,272,274 or a ring type mold as disclosed in U.S. Pat. No. 4,830,650.

Within the past several years, considerable emphasis has been placed on the use of thinner glass sheets for automobile side windows as a means of reducing overall weight of the vehicle and obtain better fuel mileage. This has posed problems in shaping and tempering due to the lesser ability of thinner sheets, such as those having nominal thicknesses ranging from less than three millimeters to four millimeters, to retain heat and difficulties in utilizing the aforementioned glass sheet bending and tempering processes to process thin sheets. As the thickness of the glass decreases, the rate of heat loss increases and the heat initially imparted to such thin sheets is quickly dissipated upon leaving the heating atmosphere of the furnace and during the relatively cool shaping step. Attempts to solve these problems by initially overheating the thin glass sheets have not been entirely successful due to, among other things, the degradation of the surface quality of the finished glass as a result of roll ripple distortion and roll marking.

It would be beneficial to the glass sheet shaping art to develop a technique that combines the high speed operation of a roll forming method while maintaining the optical quality and shape control of glass obtainable by pressing a glass sheet against a vacuum mold.

SUMMARY OF THE INVENTION

The present invention discloses an apparatus for shaping heat softenable sheet material, and in particular, a glass sheet. Means are provided to deliver a heat softened glass sheet to a shaping station which includes an upper vacuum mold having a downwardly facing shaping surface generally conforming to a desired glass sheet shape. Means are provided to engage the sheet with the shaping surface, secure against the shaping surface and to move the mold and glass sheet to a transfer station. The transfer station includes a conveying surface generally corresponding to the desired glass sheet shape. Means are provided to deposit the shaped glass sheet from the upper mold onto the conveying surface which maintains the sheet's shaped configuration. In one particular embodiment of the invention, conveyor rolls deliver the heat softened sheets to the shaping station and a flexible shaping ring is used to lift the sheet into engagement with the vacuum pickup shaping surface. Vacuum is drawn through the pickup to hold the sheet and the vacuum is terminated to deposit the sheet onto the shaped conveying surface at the transfer station. The conveying surface is formed by a set of conveyor rolls each having a transversely curved elevational contour to support and advance the shaped glass sheet through the transfer station. The shaped glass sheet is deposited onto the transversely curved rolls at the transfer station while the upper mold and glass sheet is moving from said shaping station to the transfer station to impart movement in the glass sheet along the conveying surface as it contacts the curved rolls. The movement of the glass sheet as it contacts the rolls is preferably at a speed which is the same as the speed at which the glass sheet advances along the curved conveyor rolls to minimize any change is the glass sheet speed when the shaped glass sheet is deposited from the vacuum mold onto the curved conveyor rolls.

The present invention also discloses a method of shaping a glass sheet including the steps of heating a glass sheet to its heat softening temperature, conveying the sheet to a shaping station having an upper mold with a downwardly facing shaping surface which generally corresponds to a desired shape of the glass sheet, engaging the sheet with the downwardly facing shaping surface, drawing a vacuum through the shaping surface to conform said glass sheet to said downwardly facing shaping surface, moving the mold and the engaged glass sheet to a transfer station having a contoured conveying surface, releasing the vacuum to deposit the shaped sheet directly onto the conveying surface and advancing the sheet along the conveying surface. The releasing step is preferably practiced during the moving step such that the shaped glass sheet is advancing along the contoured conveying surface as it is deposited onto the curved conveyor rolls.

This invention is capable of producing a variety of simple and complex glass shapes at a rate only slightly less than that obtained by a roll forming operation, because the vertical displacement of each glass sheet in turn needed to engage and disengage the upper vacuum mold is considerably less than that required to provide clearance for a transfer ring. At the same time, transferring a glass sheet shaped to conform to a vacuum mold throughout substantially its entire extent through a short vertical distance directly onto a contoured conveying surface conforming to the transverse curvature of the shaped glass sheet minimized potential misshaping the glass sheet beyond acceptable tolerances and causes less disruption to the glass sheet shape than when the shaped glass sheet is dropped a greater vertical distance and/or onto a shaped surface that does not fully support the shaped glass sheet.

DESCRIPTION OF PREFERRED EMBODIMENT

Figure 1:
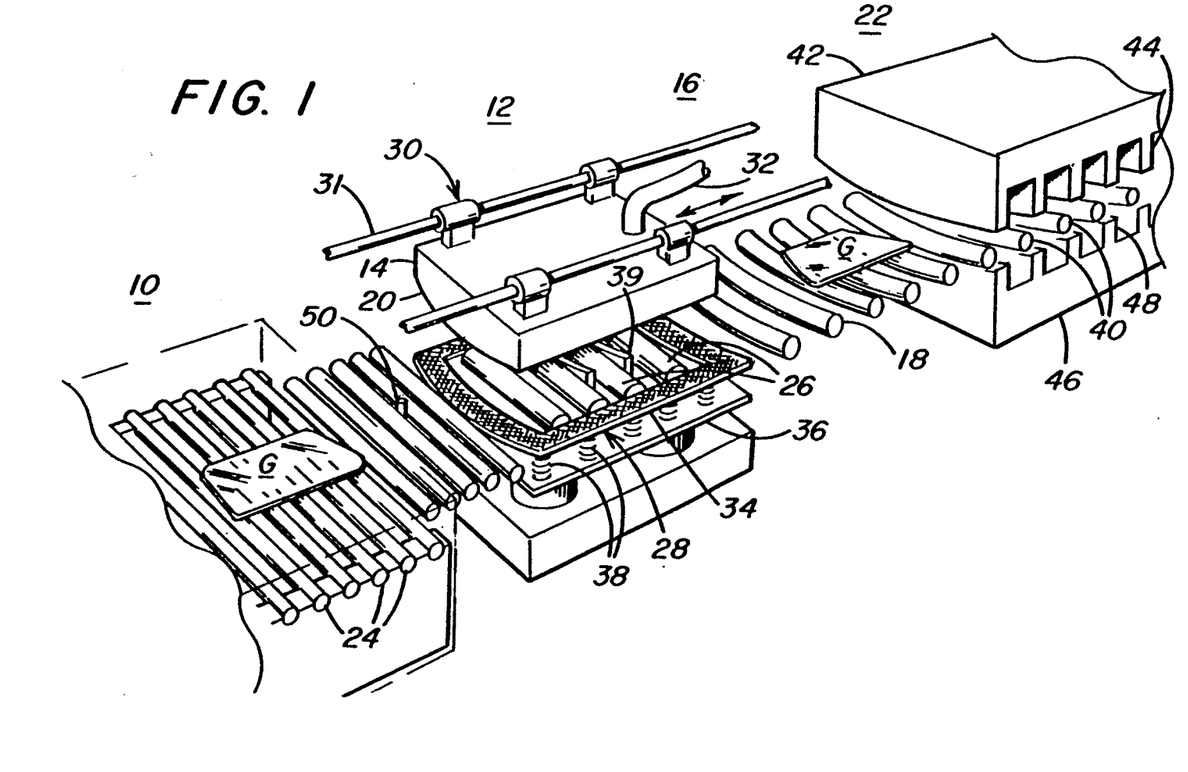
FIG. 1 is a perspective view of a preferred embodiment of this invention, with portions removed for clarity.

Referring to FIG. 1, an apparatus for shaping and treating heat softenable materials, such as glass but also including plastic and sheet materials, includes a tunnel-type furnace 10 through which a series of glass sheets G is conveyed from a loading station (not shown) at the upstream end of the furnace 10 along a generally horizontal path to a shaping station 12 where the glass sheet G is pressed against an upper vacuum mold 14. The mold 14 holds the glass sheet G by vacuum, as will be discussed later in more detail, and shuttles along a path to a position which is a short vertical distance above a downstream transfer station 16. Station 16 includes a series of transversely shaped conveyor rolls 18 having a transverse elevational curvature that corresponds to a transverse curvature of a downwardly facing shaping surface 20 of upper vacuum mold 14. The shaped glass sheet G is deposited onto rolls 18 which in turn maintains the glass sheet's shape as it is conveyed to a cooling station 22 which controllably cools the glass sheet G. The rolls 18 may be of any well known type, such as segmented rolls of the type shown in U.S. Pat. No. 4,311,509.

With continued reference to FIG. 1, the furnace 10 includes a horizontal conveyor with longitudinally spaced, transversely extending, cylindrical conveyor rolls 24 that define a path of travel which extends through the furnace 10. The conveyor rolls 24 may be of the type shown in U.S. Pat. No. 3,527,589 and may be arranged in sections with their rotational speed electronically adjusted in a manner well know in the art so that the speed of each conveyor section may be controlled and synchronized.

The shaping station 12 includes a series of spaced support rolls 26 of a type well known in the art, arranged to support the transverse dimension of each heat softened glass sheet G in turn as each sheet exits the furnace 10 and enters the shaping station 12, an upper vacuum shaping mold 14 and a lower shaping mold 28. If desired, the shaping station 12 may be enclosed and heated. Upper mold 14 is preferably composed of a rigid material such as ceramic, cast iron, brass or steel, and covered with a heat resistant cover such as stainless steel or fiber glass fabric. In addition, the mold 14 may include a shaping surface cooling arrangement (not shown) to cool the shaped glass sheet G while held thereagainst. This would be particularly useful in the shaping of glass sheets for windshields, wherein the sheets are subsequently annealed after shaping. The shaping surface 20 of the mold 14 that faces downward is shaped to conform throughout its extent with the shape desired for the glass sheets to be shaped. With continued reference to FIG. 1, the upper vacuum mold 14 is horizontally movable via a shuttling arrangement 30, which may be similar to that disclosed in U.S. Pat. Nos. 4,662,925 and 4,767,434, or the like. A motor drive (not shown) moves the mold 14 along guide rails 31 between shaping station 12 and transfer station 16. Mold 14 further includes an evacuation pipe 32 connected through a suitable valve arrangement (not shown) to a vacuum source (not shown). The mold 14 may also be provided with a pressurized air source which provides a positive pressure along surface 20 to help separate the heat softened glass sheet from the mold 14 when the vacuum is released. The valves for the vacuum and pressurized air lines may be synchronized according to a predetermined time cycle in any convenient manner well known in the glass sheet bending art. If desired, the rolls 24 in furnace 10 and/or the rolls 26 in shaping station 12 may be replaced with a gas hearth support arrangement of a type well known in the art.

Although not limiting in the present invention, in the embodiment illustrated in FIG. 1, lower mold 28 includes a flexible ring 34 capable of assuming a flat shape when unstressed and a deformed shape that conforms to the curvature of the upper mold 14 during pressing, similar to that taught in U.S. Pat. No. 4,830,650. The flexible ring 34 is supported on a mounting plate 36 by compliance support assemblies 38 of the type known in the art. It should be appreciated, however, that the lower mold 28 may also be a non-deformable ring having a fixed shape corresponding to the final desired peripheral configuration of the glass sheet. If desired, additional pressing pads 39 may be positioned within the periphery and ring 34 to help lift centered portions of the glass sheet G and press it against surface 20 of the upper mold 14.

Mounting plate 36 is secured to an elevator means (not shown) so that the flexible ring 34 may be vertically reciprocated from an initial position, wherein the sheet engaging surface of the flexible ring 34 is positioned below support rolls 26 in shaping station 12, to a second position above the support rolls 26 to shape the glass sheet. Support assembly 38 allows the flexible ring 34 to engage and conform to the downwardly facing shaping surface 20 of the upper vacuum mold 14. It should be appreciated that as an alternative to moving ring 34 upward between the rolls 26 to transfer the glass sheet G onto ring 34, the rolls 26 may be moved downward below ring 34 to affect the transfer. Ring 34 would then move upward and/or mold 14 would move downward to press the heat softened glass therebetween, as will be discussed later in more detail.

The transfer station 16 transfers the shaped glass sheet G on rolls 18 to the cooling station 22. In the particular embodiment of transfer station 16 illustrated in FIG. 1, the rolls 18 are aligned in essentially a horizontal orientation so that the vacuum mold 14 may shuttle the glass sheet via shuttle arrangement 20 to position a short vertical distance above the horizontal path taken by the rolls 18. This linear arrangement of rolls 18 is preferably used when the glass sheet G is bent to a cylindrical shape, i.e. the sheet is bent along the single axis. When glass sheet G is bent to a compound shape that includes both a longitudinal and transverse axis of bending, each successive roll 18 is positioned along a longitudinally extending arcuate path which corresponds to the longitudinal bend of the sheet. The path provided by shaped rolls 18 extends through a cooling station 22 to an unloading station (not shown). As an alternative to using curved rolls, the conveying surface within transfer station 16 may be a gas hearth or a belt conveyor as is known in the art.

Cooling station 22 includes a plurality of curved rolls 40, an upper plenum 42 which supplies cooling fluid under pressure in a downward direction through upper nozzle housings 44 and a lower plenum 46 which supplies cooling fluid under pressure upwardly through lower nozzle housings 48. Housings 44 and 48 have complementary curved opposing surfaces conforming to the transversely curved contour of shaped conveyor rolls 40 and are positioned in offset relation between adjacent conveyor rolls 40 to cool the shaped glass sheets G at a rate sufficient to impart a desired degree of heat strengthening. As discussed earlier, the rolls 40 are positioned along a continuation of the conveyor path defined by rolls 18, i.e. along a straight line for a cylindrical bend and along a longitudinally extending arc for a compound bend. The rotational speed of the rolls 40 may be controlled so that the shaped glass sheets may be cooled quickly to impart at least a partial temper in the shaped glass sheet, or slowly, i.e. annealed, as is common practice in the fabrication of shaped glass sheets for windshields.

In operation, as each glass sheet in turn is conveyed through furnace 10, it is heated to the glass softening temperature while supported across its entire width on successive rolls 24. A sensor 50, which may be positioned at the exit end of the furnace 10 or within the furnace 10, senses the position of a leading glass sheet in the series, and in particular its leading or trailing edge, and sends this information to a controller (not shown) which controls the conveying rates of rolls 24 in furnace 10 and rolls 26 in the shaping station 12. As the glass sheet G exits the furnace 10 and is conveyed to the shaping station 12, the flexible ring 34 is positioned below the upper conveying surface of the support rolls 26 so that the glass may be conveyed therethrough without interference.

While it is possible to preset any desired program of rotational speeds for conveyor rolls 24 and support rolls 26, in one particular embodiment, the program involves rotating conveyor rolls 24 within furnace 10 at a rate of rotation sufficient to transport a series of glass sheets through furnace 10 at a constant normal speed on the order of 400 to 450 inches (10.2 to 11.4 m) per minute. As each glass sheet G leaves the furnace 10, the downstream conveyor rolls supporting the exiting glass sheet G within the furnace 10 accelerate in unison to increase the glass sheet G speed to a speed on the order of 1200 inches (30.5 m) per minute for transfer to support rolls 26, which rotate at a 1200 inches (30.5 m) per minute peripheral speed during the glass movement from the furnace 10 to the shaping station 16. The accelerated furnace rolls 24 resume their normal speed after the glass sheet is conveyed to the shaping station 12.

When the glass sheet G is in proper position between the upper mold 14 and lower mold 28, lower mold 28 moves upward, lifting the glass sheet off rolls 26. It should be noted that as the flexible ring 34 initially contacts the marginal edge portion of the glass sheet G, the ring 34 is essentially flat so that it simultaneously contacts the entire periphery of the glass sheet to be shaped. The lower mold 28 continues to move upward to press the marginal edge portion the heat softened glass sheet G against the upper mold 14.

If desired, prior to lifting the glass sheet G with the lower mold 28, the rolls 26 may be decelerated in unison to a glass sheet speed on the order of 700 inches (17.8 m) per minute or less at the moment the lower mold 28 engages and lifts the glass sheet toward the upper vacuum mold 14. After the glass sheet is lifted by the lower mold 28, the rotational speed of rolls 26 is increased until they are accelerated to the speed required to accept the next heat softened glass sheet from the furnace 10. Decelerating the rate of rotation of support rolls 26 to a speed less than the accelerated speed of transfer from the furnace 10 to shaping station 12 before lifting the glass sheet G into engagement with shaping surface 20 of upper vacuum mold 14 may result in a smaller variation of glass sheet position from sheet to sheet when lifted off support rolls 26.

As the ring 34 engages the peripheral portions of the glass sheet and lifts it off rolls 26, the upper surface of the glass sheet initially contacts the lowest elevation of the downwardly facing shaping surface 20 of mold 14. As the ring 34 continues to lift the glass sheet and press it against the mold 14, the area of glass sheet contact with shaping surface 20 increases outward from the initial contact area and the ring 34 flexes both rotationally and longitudinally and progressively deforms until the peripheral portion of the glass sheet G conforms to the corresponding portion of the upper vacuum mold 14. Suction through vacuum mold 14 conforms the shape of the glass sheet throughout its extent to shaping surface 20.

After shaping, the lower mold 28 is lowered and the shaped glass sheet is held against the upper mold 14 by vacuum. Shuttle arrangement 30 is actuated to move upper vacuum mold 14 downstream from shaping station 12 to transfer station 16. On arrival at transfer station 16, the vacuum is discontinued to release the shaped glass sheet a short vertical distance directly onto the transversely curved conveyor rolls 18 which are rotating at the time of transfer. Rotating conveyor rolls 18 remove the bent glass sheet to the upstream end of cooling station 22. Once unloaded, upper vacuum mold 14 stops its downstream motion and returns as rapidly as possible to its glass awaiting position at shaping station 12 to await the arrival of the next glass sheet.

Although not limiting in the present invention, in a preferred embodiment, mold 14 attains a speed in transfer station 16 on the order of the peripheral speed of the transversely shaped conveyor rolls 18. The vacuum in mold 14 is then released while mold 14 is still moving within the transfer station 16 so that the glass sheet G is deposited on the rolls 18 at the roll 18 conveying rate as the glass sheet G contacts rolls 18. This reduces the relative movement between the glass sheet G and the conveying surface of rolls 18 and reduces the potential for glass surface marking.

As an alternative to unloading sheet G from mold 14 while mold 14 is still moving, it is contemplated that mold 14 may be stopped and the sheet G deposited on rolls 18 which are temporarily stopped to receive the sheet G. Once deposited at the transfer station 18, the rolls 18 may be accelerated to convey the glass sheet G into the cooling station 22.

Suitable sensors and controllers (not shown) which are well known and commonly used in the art insure that during the glass sheet shaping operation as taught herein, (a) the lower shaping mold 28 lifts each glass sheet in turn from support rolls 26 in shaping station 12 at the precise time when the glass sheet G is properly aligned over lower shaping mold 28, (b) the vacuum in mold 14 is initiated when lower shaping mold 28 lifts the glass sheet G into engagement with downwardly facing shaping surface 20 of upper vacuum mold 14, (c) the lower shaping mold 28 is lowered after glass sheet is fully sandwiched between lower shaping mold 28 and upper vacuum mold 14, (d) the shuttle arrangement 30 is actuated to move downstream to carry vacuum mold 14 with its engaged glass sheet G to transfer station 16 as soon as lower shaping mold 28 lowers sufficiently to provide clearance for the glass sheet to move downstream while held by vacuum against shaping surface 20, (e) the vacuum in upper vacuum mold 14 is released as the latter arrives at transfer station 16 to deposit the glass sheet directly onto rotating conveyor rolls 18 and (f) the mold 14 stops any further downstream movement and shuttle arrangement 30 returns upper vacuum mold 14 to shaping station 12 as soon as possible after vacuum is released.

It is preferred to limit the vertical distance that the lowest portion of the shaped glass sheet G is raised from its plane of support on rolls 26 to its supported position engaging shaping surface 20 to as small an amount as possible. A preferred distance is on the order of 0.25 inch (0.64 cm) more than the depth of transverse bend along the longitudinal axis of glass sheet movement, but improved results may occur when the lowest portion of the glass sheet is raised at its lowest point only a fraction of an inch more than its thickness. Also, at transfer station 16, conveyor rolls 18 are positioned a short vertical distance beneath shaping surface 20 with the vertical spacing between the downwardly facing shaping surface 20 and the upper supporting surface of each transversely shaped conveyor rolls 18 being essentially uniform. This vertical distance through which the glass sheet G transfers from shaping surface 20 to a shaped rolls 18 is preferably as small as possible and exceeds the glass sheet thickness by the minimum amount sufficient to insure clearance of the vacuum mold 14 and its vacuum supported glass sheet over conveyor rolls 18 when vacuum mold 14 and its glass sheet enters transfer station 16.

Since the vertical upward displacement of each glass sheet from support rolls 26 to shaping surface 20 is preferably minimized and a similar limitation applies to the deposition of each shaped glass sheet G from shaping surface 20 to shaped rolls 18, only a short time increase for each shaping cycle as compared to that experienced in roll forming results. In addition, since each glass sheet G is dropped only a short distance from shaping surface 20 to rotating rolls 18 of the same transverse curvature configuration as the sheet G, any potential misshaping of the glass sheet is minimized. Furthermore, any distortion effects are greatly reduced because each glass increment along its transverse dimension is dropped a distance equal to the distance that each other glass increment is dropped, so that each transverse increment of the glass sheet is supported simultaneously on rolls 18 to avoid any transverse sag. Also, the sheet G moves rapidly enough along adjacent rolls 18 to avoid any longitudinal sag beyond allowed tolerance. It should be appreciated that if rolls 18 are positioned along a longitudinally extending arc to accommodate a compound bend, the orientation of the upper mold 14 may be adjusted as it moves with the glass sheet G to transfer station 16 to any convenient manner known in the art, e.g. cylinders or cams, to more closely match the orientation that the glass sheet will assume when deposited onto shaped rolls 18 to minimize and maintain a uniform drop distance.

In shaping glass sheets to simple shapes, i.e. ones having only a transverse curvature, rolls 18 and 26 are preferably horizontally aligned such that the lowest point of glass contact on rolls 18 is essentially along a line in the plane of support provided by rolls 26; however, this relative orientation is not required. Rolls 18 may be above or below rolls 26 but it should be appreciated that such a configuration may require additional lifting of the glass sheet G rom rolls 26 by lower mold 28 into contact with upper mold 14 or a greater drop of the shaped glass sheet G from upper mold 14 onto curved rolls 18 or the need to have upper mold 14 vertically reciprocate to accommodate the misalignment while minimizing the glass sheet lift and drop.

Although the present invention as illustrated in FIG. 1 positions the furnace 10, shaping station 12, transfer station 16 and cooling station 22 along a straight line, it is contemplated that these glass sheet shaping components may be arranged in an "L" shaped alignment so that the shuttle arrangement 30 transfers the upper mold 14 and glass sheet G in a direction 90° relative to the centerline of the furnace 10. This configuration provides the advantage of allowing defective glass to be removed from processing by conveying it straight through the shaping station 12 to a dump are (not shown) aligned immediately downstream from the shaping station 12 without first having to pass the glass sheet through the cooling station 22.

Figure 2:
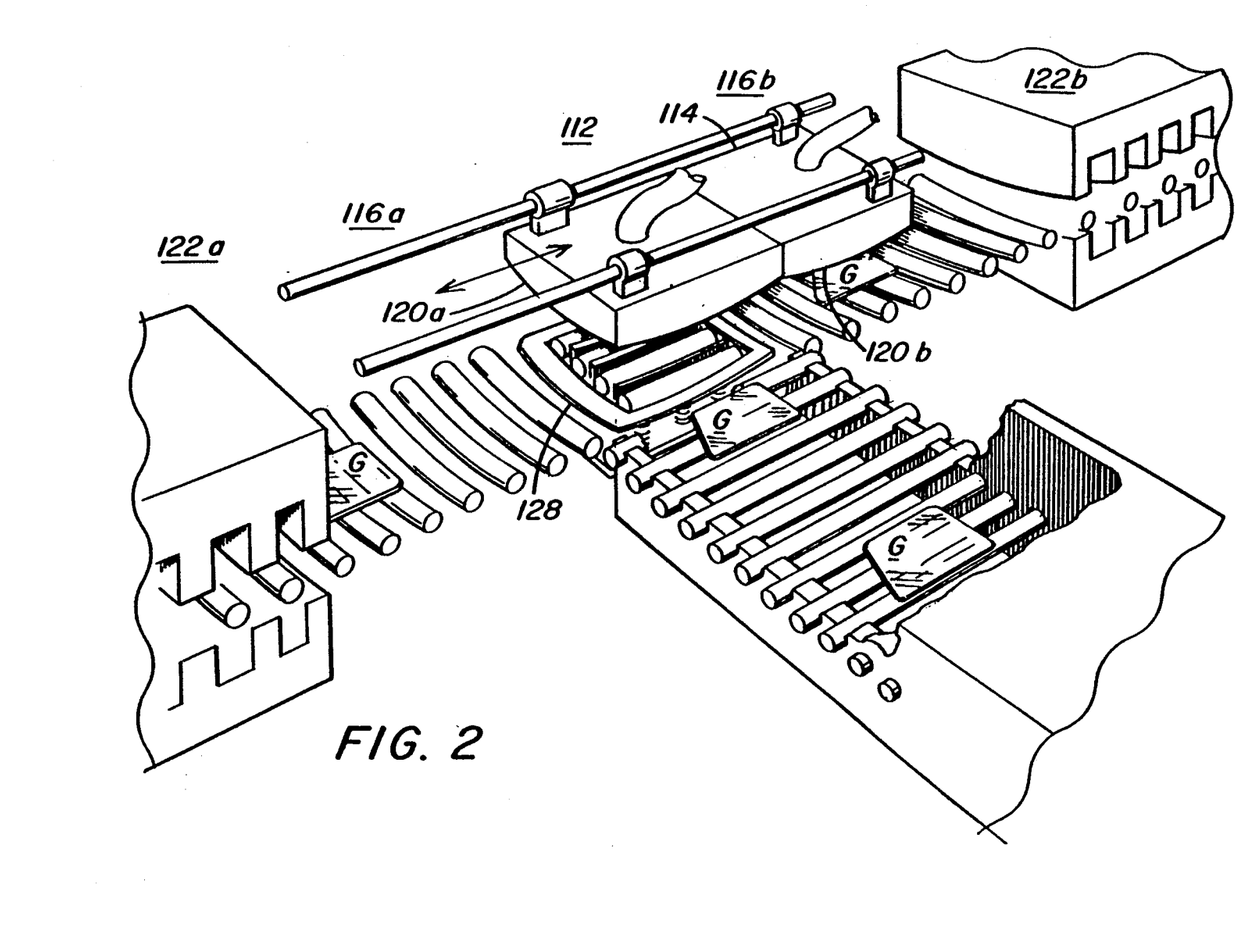
FIG. 2 is a perspective view of an alternate embodiment of the present invention, with portions removed for clarity.

Another embodiment of the invention is shown in FIG. 2. In this particular embodiment, two transfer stations 116a and 116b and two cooling stations 122a and 122b are positioned on either side of the shaping station 112. The shaping station 112 includes an upper mold 114 having two shaping surfaces 120a and 120b. Mold 114 may be two separate press face units or a single unit with a vacuum arrangement to allow independent control of each section of the mold as required. In operation, mold 114 shuttles back and forth within the shaping station 112 with one of the surfaces 120a or 120b transferring a shaped glass sheet to a corresponding transfer station while the other shaping surface is being positioned to shape the next heat softened glass sheet. More specifically, as glass sheet G enters shaping station 112, mold 114 is at a first position wherein surface 120a is within the shaping station 112 and surface 120b is at transfer station 116b. The glass sheet G is then lifted by lower mold 128 into contact with surface 120a and held thereagainst by vacuum. Lower mold 128 is lowered and mold 114 then shuttles to the left as viewed in FIG. 2 to move the glass sheet G into transfer station 116a. As the mold 114 moves, surface 120b moves from the transfer station 116b into shaping station 112. Vacuum along surface 120a is terminated and glass sheet G is deposited on the rolls 118a in transfer station 116a as discussed earlier as the next glass sheet enters the shaping station 112. After the glass sheet G is transferred from surface 120a, the mold 114 stops and the next heat softened glass sheet is positioned below surface 120b. Lower mold 128 then lifts the glass sheet G against surface 120b which draws a vacuum to hold the sheet against mold 114. The lower mold 128 is then lowered and the upper mold 114 shuttles to the right to deposit the glass sheet G onto rolls 118b at transfer station 116b and reposition surface 120a in shaping station 112 to receive the next glass sheet.

Figure 2A:
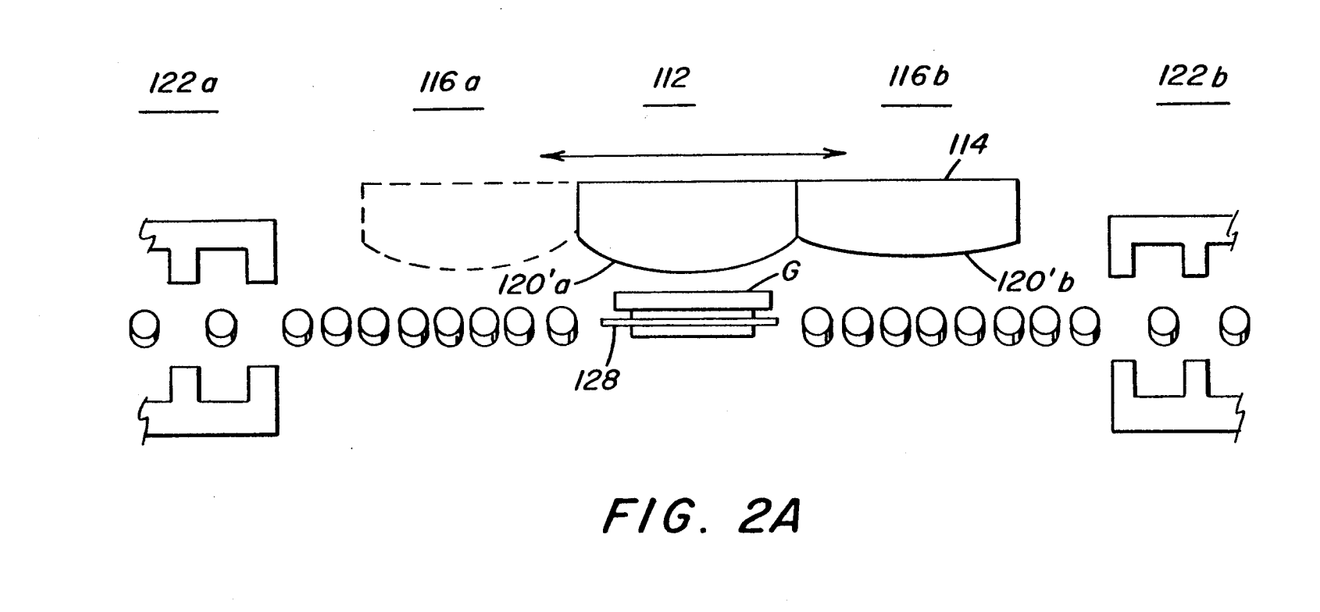
FIG. 2A is a schematic side elevational view of an embodiment similar to that shown in FIG. 2, showing multiple press faces with different shaping surfaces.

It should be appreciated that embodiment of the invention illustrated in FIG. 2 may be used to shape the glass sheets to two different configurations as illustrated in FIG. 2A. More specifically, surfaces 120'a and 120'b may correspond to the inner and outer shaped configuration of glass sheets incorporated into a laminated windshield. It is expected that with a flexible lower mold 128 of the type discussed earlier, the shapes of the inner and outer glass sheets are similar enough that the mold 128 may be used to lift and shape both glass sheets against the difference shaping surfaces.

Glass sheet lifting and pressing arrangements other than those illustrated in FIGS. 1 and 2 may be used to lift and shape the glass sheets G prior to transferring them to the transfer station. For example, the lower mold may be a slotted mold as disclosed in U.S. Pat. No. 4,272,274 or an articulating ring at disclosed in U.S. Pat. No. 4,496,386. Furthermore, the lower mold may be eliminated by using air jets of the type disclosed in U.S. Pat. No. 4,204,854 to lift the glass sheet into contact with the upper mold.

Figure 3:
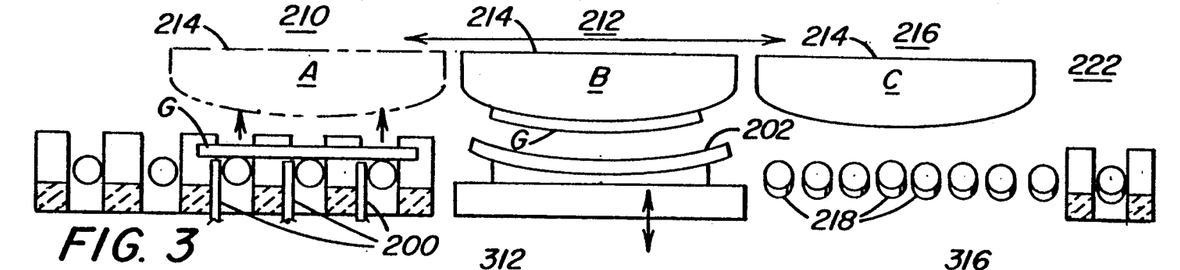
FIGS. 3, 4 and 5 are schematic side elevational views of alternate embodiments of the present invention.
Figure 4:
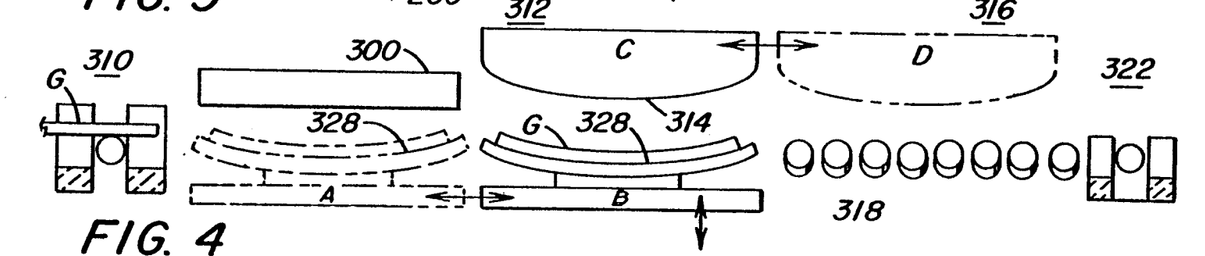
Figure 5:
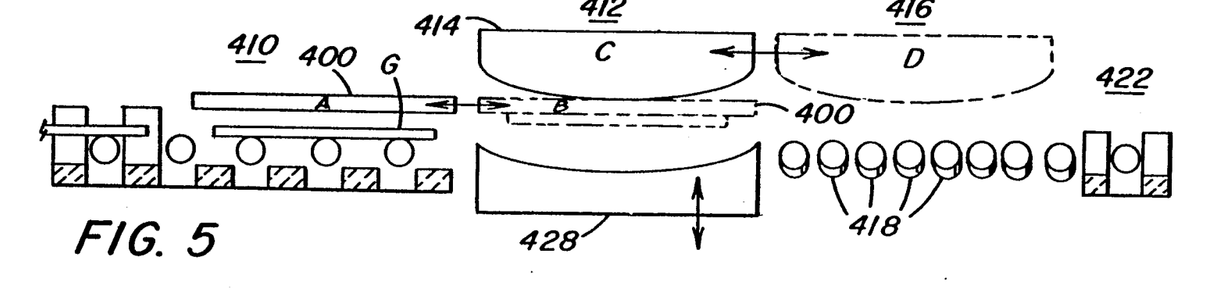

FIGS. 3, 4 and 5 illustrate other sheet shaping arrangements incorporating the sheet shaping and transfer features of the present invention. Referring to FIG. 3, air jets 200 are used to lift heat softened glass sheet G into contact with upper vacuum mold 214 at position A in furnace 210 which then shuttles downstream to position B at shaping station 212 to press the glass sheet G into a ring mold 202. After shaping, the mold 214 then moves downstream again to position C at transfer station 216 to deposit the glass sheet G on curved rolls 218 for transfer into cooling station 222 in a manner as discussed earlier. The mold 214 then returns to position A to receive the next glass sheet.

Referring to FIG. 4, the glass sheet G is transferred from furnace 310 to vacuum/pressure support 300, which supports the glass sheet G from above without contacting its upper major surface, and deposited onto a shuttling shaping ring 328 at an initial position A which moves downstream to a position B below vacuum mold 314 at shaping station 312 as disclosed in U.S. Pat. No. 4,575,390. After the glass sheet G is pressed between mold 314 and ring 328, the mold 314 with the glass sheet G held thereagainst by vacuum, moves downstream from an initial position C at shaping station 312 to a position D at transfer station 316 to deposit the glass sheet G onto rolls 318 for transfer to cooling station 322 while ring 328 moves upstream back to position A beneath the vacuum/pressure support 300. After depositing the glass sheet G, mold 314 returns to position C.

Referring to FIG. 5, a vacuum pickup 400 lifts the glass sheet G and transfers it from position A within the furnace 410 to position B at shaping station 412 where it is deposited between vertically aligned, full surface upper vacuum mold 414 and lower full surface mold 428 as disclosed in U.S. Pat. No. 4,662,925. After the glass sheet G is pressed between the molds and a vacuum is drawn through upper vacuum mold 414, the mold 414 moves downstream from position C with the glass sheet G secure thereagainst to position D at the transfer station 416 where the sheet is deposited onto rolls 418 for transfer to cooling station 422. If desired, pressurized air may be supplied through the lower mold 428 to help separate the shaped glass sheet from the lower mold's shaping surface.

The pressing arrangements illustrated in FIGS. 1, 3, 4 and 5 may also be used to form more than one glass sheet shape. In particular, the upper and lower molds or rings may have common, overlapping center region and different end regions as disclosed in U.S. Pat. No. 4,579,573.

It should be further appreciated that the present invention may be used to shape glass sheets in a convex upward configuration by using an upper female mold, i.e. a mold with a concave downward shaping surface and a lower male mold, i.e. a mold with a convex upper shaping surface. The molds may be full surface ring type molds as disclosed in U.S. Pat. Nos. 4,746,348 and 5,004,491. With such arrangements, the curvature of rolls 18 and 40 in the shaping station 12 and transfer station 16 respectively must be adjusted to accommodate this type of shaped configuration.

The forms of the invention shown and described in this specification represent illustrative preferred embodiments and it is understood that various changes may be made without departing from the spirit of the invention as defined in the following claimed subject matter.

We claim:

1. A method of shaping heat softenable sheet material comprising:

heating a sheet to its heat softening temperature;

conveying said sheet to a shaping station having an upper mold with a downwardly facing shaping surface which generally corresponds to a desired shape of said sheet;

engaging said sheet with said downwardly facing shaping surface;

drawing a vacuum through said shaping surface to conform said sheet to said downwardly facing shaping surface;

moving said mold and said engaged surface to a transfer station having at least one member providing a contoured conveying surface;

releasing said vacuum to deposit said shaped glass directly onto said conveying surface; and advancing said sheet along said conveying surface.

2. A method as in claim 1 wherein said releasing step is practiced during said moving step such that said shaped sheet is advancing along said contoured conveying surface as it is deposited onto said contoured conveying surface.

3. The method as in claim 2 wherein said moving step includes the step of moving said vacuum mold from said shaping station to said transfer station at a speed which is the same as the speed at which said shaped sheet moves along said contoured conveying surface during said advancing step so as to minimize any change in said sheet speed when said vacuum is released and said sheet is deposited from said vacuum mold to said contoured conveying surface.

4. The method as in claim 2 wherein said conveying step includes the step of conveying said sheet along a generally horizontal path to a position below said vacuum mold and wherein said engaging step includes the step of raising a lower mold from below said horizontal path to a position above said horizontal path to press said sheet between said lower mold and said vacuum mold.

5. The method as in claim 2 wherein said conveying step includes the step of positioning said heat softened sheet on a lower shaping surface and said engaging step includes the step of moving said lower shaping surface and upper vacuum mold relative to each other to press said sheet therebetween.

6. The method as in claim 2 further including the step of controllably cooling said shaped sheet.

7. The method as in claim 2 wherein said downwardly facing surface is a first downwardly facing surface, said transfer station and contoured conveying surface is a first transfer station and a first contoured conveying surface and further including a second transfer station with a second contoured conveying surface and said upper mold includes a second downwardly facing shaping surface initially positioned at a second transfer station when said first shaping surface is at said shaping station wherein during said first moving step said second shaping surface moves from said second transfer station to said shaping station and after said moving step, further including the steps of engaging a subsequent heat softened sheet with said second downwardly facing shaping surface within said shaping station, drawing a vacuum through said second shaping surface to conform said subsequent sheet to said second downwardly facing shaping surface, subsequently moving said second shaping surface and said subsequent shaped sheet to said second transfer station, releasing said vacuum through said second shaping surface during said subsequent moving step to deposit said subsequent shaped sheet directly onto said second contoured conveying surface while said sheet is moving along said second contoured conveying surface and advancing said subsequent sheet along said second contoured conveying surface, wherein during said subsequent moving step, said first downwardly facing shaping surface moves from said first transfer station to said shaping station.

8. The method as in claim 7 wherein said first downwardly shaping surface is different from second downwardly facing shaping surface such that said engaging and applying steps produce sheets of different shaped configurations.

9. An apparatus for shaping heat softenable sheet material, comprising:
 a shaping station including an upper vacuum mold having a downwardly facing shaping surface generally conforming to a desired sheet shape;
 means to deliver a heat softened sheet to said shaping station;
 means to engage said sheet with said shaping surface;
 means to draw a vacuum along said shaping surface to secure said sheet thereagainst at said shaping station;
 a transfer station including at least one sheet supporting member having a conveying surface generally corresponding to said desired sheet shape;
 means to move said upper mold and said sheet between said shaping station and said transfer station; and
 means to release said vacuum to deposit said shaped sheet from said upper mold onto said conveying surface while said upper mold and sheet are moving from said shaping station to said transfer station to impart movement in said sheet along said conveying surface as said sheet contacts said conveying surface.

10. An apparatus for shaping heat softenable sheet material, comprising:
 a shaping station including an upper vacuum mold having a downwardly facing shaping surface generally conforming to a desired sheet shape;
 means to deliver a heat softened sheet to said shaping station;
 means to engage said sheet with a shaping surface;
 means to draw a vacuum along said shaping surface to secure said sheet thereagainst at said shaping surface;
 a transfer station including a set of conveyor rolls each having a transversely curved elevational contour to support and advance said shaped sheet through said transfer station, said rolls forming a conveying surface generally corresponding to said desired sheet shape;
 means to move said upper mold and said sheet between said shaping station and said transfer station; and
 means to release said vacuum to deposit said shaped sheet from said upper mold onto said conveyor rolls.

11. The apparatus as in claim 10 wherein said conveying surface formed by said rolls extends through a cooling station to controllably cool said shaped sheet.

12. The apparatus as in claim 10 wherein said moving means includes means to move said vacuum mold and sheet to said transfer station generally at a speed which is the same as the speed at which said sheet advances along said transversely curved conveyor rolls to minimize any change is said sheet speed when said shaped sheet is deposited from said vacuum mold onto said transversely curved conveyor rolls.

13. The apparatus as in claim 10 wherein said shaping station further includes a set of longitudinally spaced, transversely extending support rolls forming a sheet support surface and a lower mold vertically aligned with said upper mold at a recessed position below said sheet supporting surface and having a shaping surface complementing selected portions of said upper mold and further wherein said engaging means includes means to move said lower mold from said recessed position to a raised position above said sheet supporting surface to lift said sheet and press it against said vacuum mold shaping surface.

14. The apparatus as in claim 13 wherein said lower mold includes a flexible outline shaping surface having a flat configuration when said lower mold initially engages a marginal edge portion of said sheet and lifts said sheet off said sheet support surface, and a shaped configuration when said lower mold presses said sheet against said vacuum mold to conform said marginal edge portion of said sheet to a corresponding portion of said vacuum mold shaping surface.

15. The apparatus as in claim 10 wherein said delivery means includes means to position said heat softened sheet on a lower shaping surface and means to align said lower shaping surface and said sheet below said upper vacuum mold and said engaging means includes means to press said heat softened sheet between said upper vacuum mold and lower shaping surface.

16. The apparatus as in claim 10 wherein said engaging means includes means to direct air at a lower major surface of said heat softened sheet to lift said sheet into engagement with said vacuum mold shaping surface.

17. The apparatus as in claim 16 wherein said air directing means includes a plurality of jets positioned below said upper vacuum mold and oriented to direct air at said lower major surface of said heat softened sheet.

18. The apparatus as in claim 10 wherein said transfer station is a first transfer station and further including a second transfer station, said first and second transfer stations being positioned along opposing sides of said shaping station, and wherein said downwardly facing shaping surface of said upper vacuum mold is a first downwardly facing shaping surface and said upper vacuum mold includes a second downwardly facing shaping surface, and further wherein said moving means includes means to move said vacuum mold between said transfer stations and said shaping station such that when said first downwardly facing shaping surface is positioned at said first transfer station, said second shaping surface is positioned at said shaping station and when said second shaping surface is at said second transfer station, said first shaping surface is positioned at said shaping station, said engaging means includes means to engage a heat softened sheet with said second downwardly facing shaping surface when said second surface is at said shaping station, said vacuum drawing means includes means to draw a vacuum along said second shaping surface when engaging a heat softened glass sheet, and said releasing means includes means to release said vacuum along said second shaping surface to deposit a shaped sheet from said second shaping surface onto said second conveying surface at said second transfer station while said sheet is advancing along said second conveying surface.

19. The apparatus as in claim 18 wherein said first shaping surface has a shaped configuration different from said second shaping surface.

20. A method of shaping heat softened sheet material comprising:
heating a sheet to its heat softening temperature;
conveying said sheet to a shaping station having an upper mold with a downwardly facing shaping surface which generally corresponds to a desired shape of said sheet;
engaging said sheet with said downwardly facing shaping surface to shape said sheet;
transferring said shaped sheet to a transfer station having at least one member providing a contoured conveying surface;
depositing said shaped sheet onto said conveying surface; and
advancing said sheet along said conveying surface.

* * * * *